May 15, 1951          J. J. BROPHY          2,552,768
THREAD JOINT FOR TUBULAR MEMBERS
Filed Aug. 17, 1949
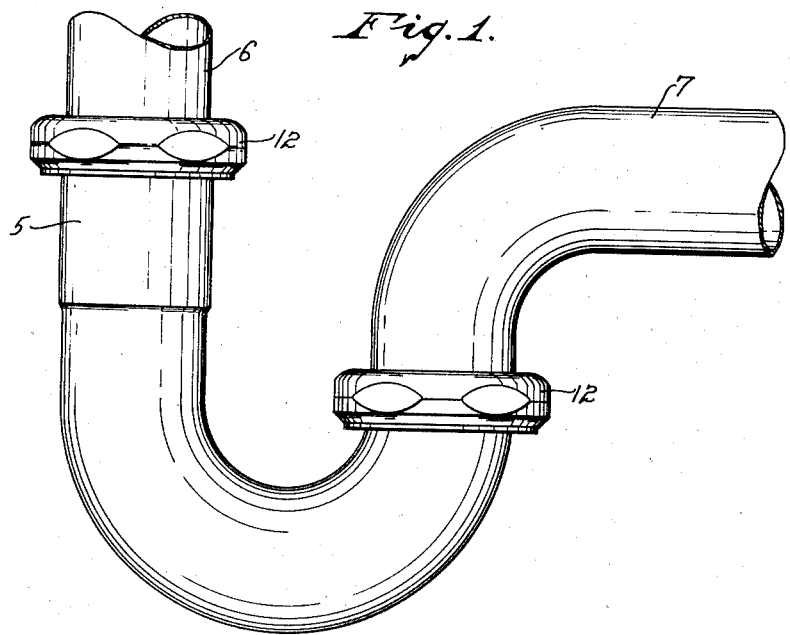
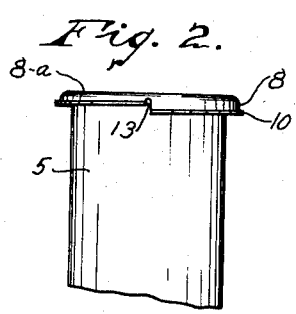
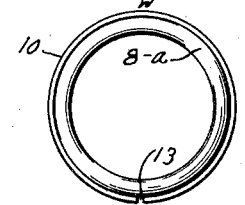
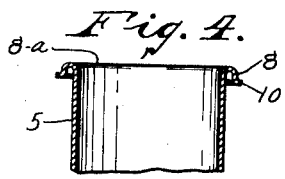
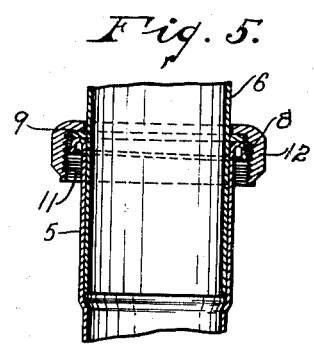
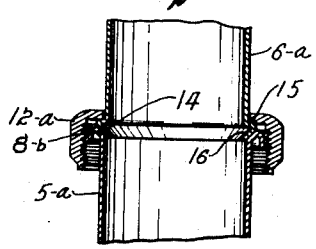
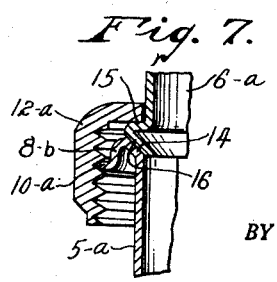
INVENTOR.
JOSEPH J. BROPHY
BY
Louis V. Lucia
ATTORNEY Patented May 15, 1951

2,552,768

UNITED STATES PATENT OFFICE 2,552,768

THREAD JOINT FOR TUBULAR MEMBERS

Joseph J. Brophy, Newington, Conn.

Application August 17, 1949, Serial No. 110,783

3 Claims. (Cl. 285—122)

This invention relates to a threaded joint for tubular members and more particularly to a novel formation for the end portion of a tubular member for providing a screw thread thereon which is highly economical to produce.

An object of this invention is the provision of a novel thread construction which may be integrally formed at the end of a tubular member so as to provide a screw thread which is strong, durable and inexpensive.

A further object of this invention is the provision of such a construction which will provide a screw thread at the end of a tubular member that may be used with a cooperating nut of standard design.

A still further object of the invention is the elimination of heretofore required parts and operations for materially reducing the cost of production of such joints.

A still further object of the invention is the provision of a formation at the end of a tubular member which will provide an integral screw thread and a cooperating seat for receiving a sealing member and a nut of conventional standard design.

Further objects and advantages of the invention will be more clearly understood from the following description and the accompanying drawing in which:

Fig. 1 is a side view of a trap constructed of tubular members embodying my invention.

Fig. 2 is an elevational view of an end portion of a tube embodying my invention.

Fig. 3 is a plan view thereof.

Fig. 4 is a side view thereof in central vertical section.

Fig. 5 is a side view of a slip coupling including a tube which embodies my present invention.

Fig. 6 is a similar view of a modified form of my invention showing a tapered joint for tubular members.

Fig. 7 is a similar view of a portion of said modified form on an enlarged scale.

In the embodiment of the invention illustrated in the drawings, the numeral 5 denotes a tubular member in the form of a trap for a plumbing fixture. It will be understood, however, that my invention may be provided on tubular members of various shapes, and is not limited to the trap shown herein for the purpose of explanation.

In the trap illustrated in Fig. 1, there is commonly included the said tubular member 5, a drain tube 6 which extends from the plumbing fixture and an outlet tube 7.

My invention is particularly directed to the formation of the end portion of said tubes, such as 5 and 7, to provide a highly efficient and inexpensive coupling. This is attained by the constructions illustrated in the drawings which provide a slip joint as well as fixed or tapered joint.

As illustrated in Figs. 2 to 5, the end portion of the tube wall is bent outwardly and backwardly upon itself for a short distance to form a flange 8 and a seat 8—a at the top thereof, for a conventional packing ring or washer such as indicated at 9. The free edge portion of the said flange is then bent outwardly on a helical plane to provide a helical thread flange 10 which forms a male screw thread adapted to fit the female thread 11 in a conventional nut 12. The pitch of the thread is provided by slitting or notching the flange 8 at a point inwardly of the seat 8—a as indicated at 13. This also permits easy starting of the nut 12 on the thread 10.

As illustrated in Fig. 5, it will be noted that in the use of the above described joint construction, the packing washer 9 is forced upon the seat 8—a by means of the nut 12 which causes the said washer to expand against the outer surface of the tube 6 and thereby provides a leak proof joint.

In order to comply with the building codes in many localities, I provide a modified form of my improved joint construction which is in the form of a tapered or ground joint which may be employed on the opposite end of the trap or on any other form of tube so desired.

Referring to Figs. 6 and 7, it will be noted that the end portion of the tube 5—a is bent outwardly and rearwardly in the same manner as in the form illustrated in Figs. 2 to 5 and provided with an identical thread flange 10—a but, in addition, the flange 8—b is shaped to provide a tapered surface on the inner portion thereof to form a seat 14. The end portion of the tube 6—a is bent laterally and inwardly in a forward direction to provide a shoulder 15 which abuts the nut 12—a and a male tapered seat 16 which fits upon the female seat 14 providing a rigid leak proof joint.

The screw thread provided by the flanges 10 and 10—a in the above described forms of my invention, are exceedingly strong and durable due particularly to the fact that they are backed by the rearwardly extending portion of the flanges 8 and 8—b on the tube so that the pressure applied against the said thread is in the direction of the said portions and thereby eliminates the possibility of the flange bending or straightening out under the pressure of the nut 12.

I have found that the above described joint constructions may be easily and inexpensively attained by means of simple dies which will produce uniform and accurate formations providing the seat and thread for my improved joint as an integral part of the tube and thereby materially reducing the cost of such joints and elimination of heretofore used collars and flanges which have been produced on screw machines and necessarily had to be attached to the ends of the tubes by soldering or other similar costly operations.

I claim:

1. A screw thread construction for a tubular member including a portion of said member bent outwardly to form a seat at the end of the tube and then rearwardly, then outwardly to provide a flange, said flange having a slit therethrough and bent into helical form, thereby providing a single thread adapted to receive a coupling member.

2. A screw thread construction for a tubular member including a portion of said member bent outwardly to form a seat at the end of the tube and then rearwardly, then outwardly to provide a flange, said flange having a slit therethrough and bent into helical form, thereby providing a single thread adapted to receive a coupling member, and a gasket on said seat adapted to be engaged by said coupling member.

3. A screw thread construction for a tubular member including a portion of said member bent outwardly to form a seat at the end of the tube and then rearwardly, then outwardly to provide a flange, said flange having a slit therethrough and bent into helical form, thereby providing a single thread adapted to receive a coupling member, said seat being tapered upwardly and outwardly and a second tubular member having a tapered end portion for seating engagement with said tapered seat and held thereon by said coupling member.

JOSEPH J. BROPHY.

REFERENCES CITED

The following references are of record in the file of this patent:

UNITED STATES PATENTS

| Number | Name | Date |
|---|---|---|
| 898,510 | Schlafly | Sept. 15, 1908 |
| 1,137,955 | Dies | May 4, 1915 |
| 1,777,977 | Lente | Oct. 7, 1930 |
| 1,981,247 | Pope | Nov. 20, 1934 |
| 2,461,354 | Stone | Feb. 8, 1949 |